United States Patent
Matsui et al.

[11] 3,806,782
[45] Apr. 23, 1974

[54] ELECTROMAGNETIC RAIL FOR DRIVING LINER MOTOR AND METHOD OF CONSTRUCTION THEREOF

[75] Inventors: Kazumi Matsui; Takashi Umemori, both of Tokyo; Tadashige Nishirkawa, Yokohama; Makoto Tawara, Hiratsuka; Kenji Matsuura; Yoshikada Hosoda, both of Osaka, all of Japan

[73] Assignees: Japanese National Railways; The Furukawa Electric Company Limited, both of Tokyo; Sumitomo Electric Industries Limited, Osaka, all of, Japan

[22] Filed: Apr. 11, 1973

[21] Appl. No.: 350,198

[30] Foreign Application Priority Data

| Apr. 21, 1972 | Japan | 47-40245 |
| Apr. 21, 1972 | Japan | 47-40246 |
| Apr. 21, 1972 | Japan | 47-40247 |
| Apr. 21, 1972 | Japan | 47-40248 |
| Sept. 2, 1973 | Japan | 48-88118 |
| Aug. 25, 1972 | Japan | 47-99208 |
| Aug. 25, 1972 | Japan | 47-99211 |

[52] U.S. Cl............ 318/135, 29/602, 104/148 LM, 310/13
[51] Int. Cl. .......................................... H02k 41/02
[58] Field of Search............ 104/148 MS, 148 LM; 310/12, 13, 14, 27; 29/602, 605, 606; 318/135

[56] References Cited
UNITED STATES PATENTS

| 3,771,033 | 11/1973 | Matsui et al. | 310/13 |
| 3,407,749 | 10/1968 | Frig | 318/135 X |
| 3,547,041 | 12/1970 | Malopodvalnaya et al. | 104/148 LM |
| 3,644,762 | 2/1972 | Eastham | 104/148 LM |
| 3,616,763 | 11/1971 | Colling et al. | 318/135 X |

Primary Examiner—Gerald Goldberg
Attorney, Agent, or Firm—Flynn & Frishauf

[57] ABSTRACT

An electromagnetic rail for driving a train by a semiconductor controlled rectifier linear motor comprises an armature coil including a plurality of juxtaposed rows of composite coil arrays which are arranged in the longitudinal direction of the rail. Each composite coil array comprises two coil arrays, each having a plurality of serially connected rectangular coils, arranged in a straight line, spaced from one another with a pitch equal to the length of one coil, which are combined into a single row by so arranging the rectangular coils in one array as to fit in the one-coil-length intervals between the respective rectangular coils in the other array, the rectangular coils in one of the said two coils arrays being wound in a direction opposite to that of the rectangular coils in the other coil array.

An induction coil may be disposed beneath the armature coil to generate floating and braking forces.

16 Claims, 20 Drawing Figures

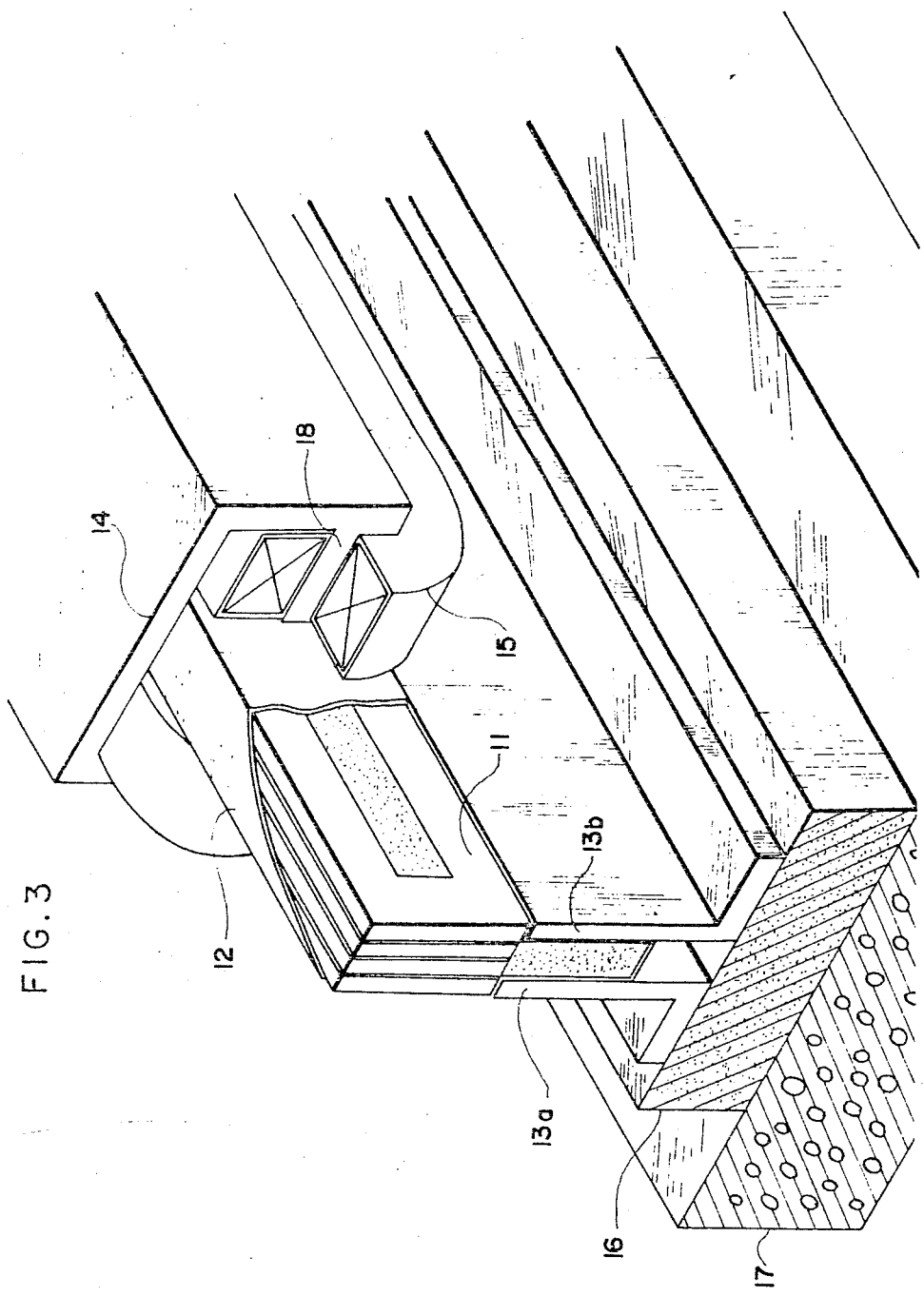

FIG.4
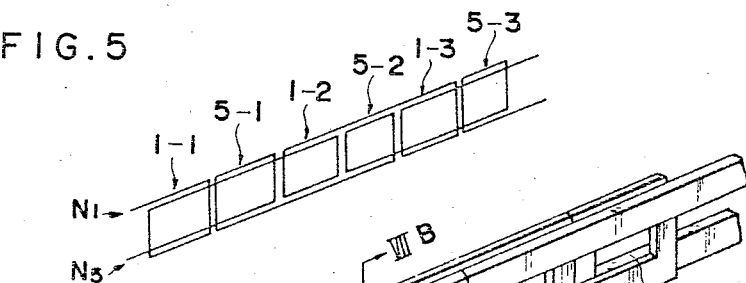
FIG.5
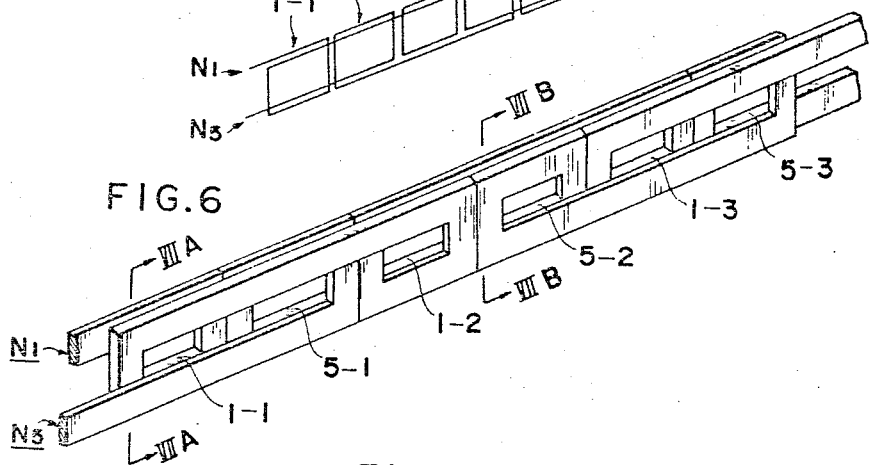
FIG.6
FIG.7A  FIG.7B
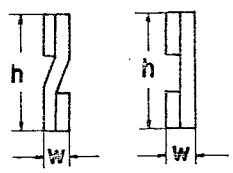

FIG.8
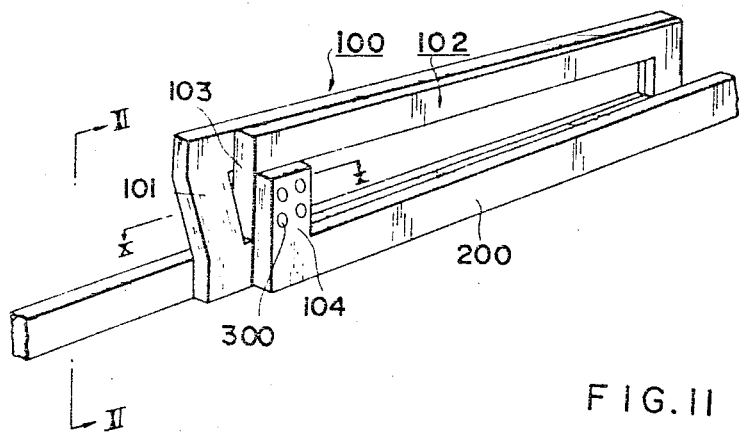
FIG.9
FIG.10
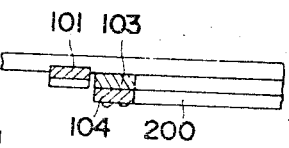
FIG.11
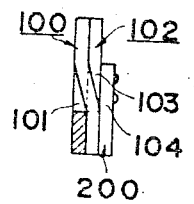
FIG.12
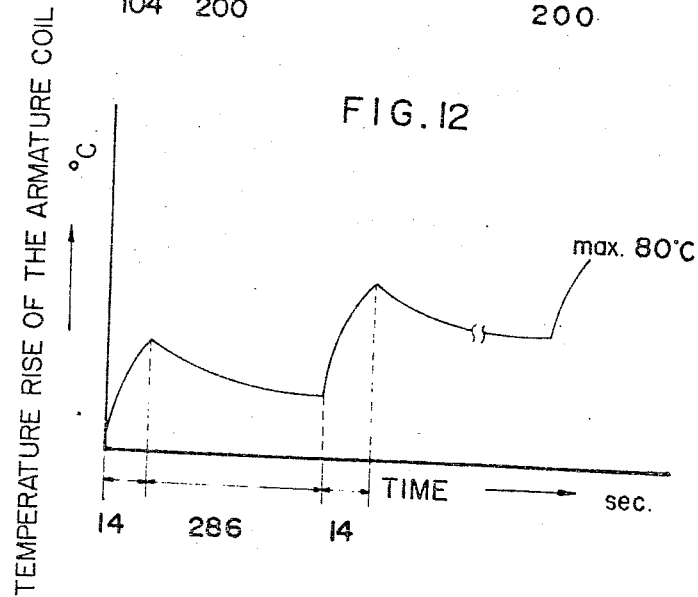

ELECTROMAGNETIC RAIL FOR DRIVING LINER MOTOR AND METHOD OF CONSTRUCTION THEREOF

BACKGROUND OF THE INVENTION

Ordinary railway cars are supported by wheels rolling on rails and driven by utilizing the adhesion between the rails and the wheels rotated by the torque transmitted thereto from electric motors or the like prime mover. With this powering system, however, a running speed of higher than 300 kilometers/hour is difficult to obtain due to decrease in the adhesive power. For this reason, for use in high speed railways a method of directly driving the vehicles by induction linear motors has been proposed. However, many problems such as low power factor, low efficiency, edge effect and the like must be solved before practical use of this system. The running of conventional trains are generally controlled by drivers who judge the operating condition in accordance with information given by various meters on the train or signals situated along the railroad. In recently developed automatic running system, the judgements and controls which have been performed by the drivers are taken over by an automatic control or running system comprising an electronic computor. According to this system, however, it is necessary to mount computers on respective trains and to provide a complicated information transmission system between respective trains and a control center on the ground, thus requiring an extremely large cost of installation for whole railway system.

A semiconductor controlled rectifier (known as Thyristor or silicon controlled rectifier) operated linear motor system is now being investigated as the most suitable driving system for automatic control of high speed railway vehicles. FIG. 1 shows an example of an electrical system and FIG. 2 is a perspective view of ground coils and the magnetic field structure 10 mounted on a vehicle not shown.

As shown in FIG. 1 the electrical system comprises a plurality of groups of armature coils $a$–1 — $a$–4, $b$–1 — $b$–4, $c$–1 — $c$–4 and $d$–1 — $d$–4. Coils in each group are connected in series, and the groups of the coils are juxtaposed with the coils of one group displaced from the coils of another group by a predetermined phase angle. The entire coil assembly is covered by a protective material and secured to a suitable support on the ground with respective coil planes held vertically. For the sake of brevity, the ground coil assembly constructed as above described will be referred to as "electromagnetic rail."

A filed structure 10 mounted on the vehicle includes an air gap extending in the running direction of the vehicle and adapted to receive therein the coil assembly with suitable gaps therebetween. The field structure is provided with an exciting coil, not shown, to create magnetic flux B which interlinks the armature coil in a direction perpendicular to the plane thereof. The currents flowing through the groups of armature coils are suitably reversed, switched, turned on or off by means of a frequency converter 20 in the form of known cyclo-converter, inverter, chopper, or flip-flop circuit utilizing semiconductor control rectifiers or the like converting means, under control of a control signal 30 synchronized with the position of the field structure 10 mounted on the vehicle or a control signal determined in accordance with a predetermined pattern, whereby the field structure 10 and hence the vehicle is propelled synchronously with the switching of the coil currents. Further, a semiconductor controlled rectifier linear motor system is also under investigation wherein the magnetic flux B of the car mounted field structure 10 links with the lower sides of the armature coils so as to produce the floating force.

During the course of developing the novel electromagnetic rail we have manufactured and tested an electromagnetic rail as shown in FIG. 3 (this construction has not been published). According to this trail, rectangular turns of a desired number of an armature coil 11 are suitably insulated from each other and a covering 12 of glass fiber reinforced plastic is applied about the armature coil 11. The assembly is then moulded with a thermoplastic resin into an integral unit. The lower extension of the moulded unit is clamped between a pair of L shaped clamping plates 13$a$ and 13$b$ of a nonmagnetic metal such as aluminum or stainless steel which are mounted on a concrete foundation 17 with a slab for example concrete block 16 in between.

A field structure 14 including field poles 18 and exciting coils 15 wound thereon is suspended from the floor of a car (not shown). The field poles 18 are arranged to receive the armature coil 11 in the air gap between the poles so that the magnetic flux produced by the exciting coils 15 interlinks the desired side of the armature coil. As a result, by commutating the current flowing through the armature coil a shifting or progressing field is created to continuously apply a driving force or a combination of driving and floating forces to the car.

In the construction of the armature coil shown in FIG. 3, an armature coil comprises a plurality ($n$) of juxtaposed coil arrays, each including a predetermined number of rectangular coils which are arranged in a straight line with a pitch equal to the length of a rectangular coil and connected in series, each of the rectangular coils having a predetermined number of turns. The n coil arrays are staggered one after another with a predetermined phase so that respective rectangular coils of the ($n/2 + 1$)th coil array are positioned at portions along the rail corresponding to the one-pitch intervals between respective rectangular coils of the first coil array. With reference now to FIG. 4, the arrangement will be described hereunder in connection with one example wherein the number of the coil arrays is 8. The coil arrays are designated by reference numerals N1 through N8 and each coil array comprises a plurality of serially connected rectangular coils of predetermined number of turns, 1—1, 1–2, 1–3, . . . 2–1, 2—2, 2–3, . . . 3–1, 3–2, 3—3, . . . and 8–1, 8–2, 8–3, . . . . Respective rectangular coils of each coil array are arranged in a straight line with a pitch which is equal to the length of each rectangular coil and are connected in series with each other. Respective rectangular coils (5–1, 5–2, 5–3 . . .) of the ($n/2 + 1$)th (in this case the fifth) coil array are disposed at positions corresponding to the gaps between respective rectangular coils (1—1, 1–2, 1–3 . . .) of the first array. When constructing the armature coil of a semiconductor controlled rectifier linear motor by using n coil arrays it is necessary to arrange the arrays so that the respective rectangular coils of the ($n/2 + 1$)th to the $n$-th coil arrays fit coil to coil intervals of the first to the $n/2$th coil arrays so as to form composite coil arrays with a resultant reduction in the thickness of the armature coil, which reduces the size and therefore weight of the field structure field gap and the weight of the field structure.

When the rectangular coils of two arrays of the composite coil array are wound in the same direction, the total length of respective arrays is increased due to connecting leads between coils whereby the field gap and hence the width and weight of the field structure will be increased.

It is therefore an object of this invention to provide a novel electromagnetic rail for driving trains by a semiconductor controlled rectifier linear motor which utilizes an improved armature coil of improved space factor thereby decreasing the width and accordingly the size and weight of the air gap of the field structure and hence improving the characteristics of the linear motor.

A further object of this invention is to provide an electromagnetic rail so designed as to facilitate its manufacturing, installation, maintenance and inspection.

A still further object of this invention is to provide an improved electromagnetic rail in which the connection between armature coils can be made without changing the contour of the rail and without damaging the insulations utilized in the rail.

Another object of this invention is to provide an improved electromagnetic rail having such a function as to give an additional floating force to the car and, in case of sudden current stoppage, prevent the car from falling rapidly and give it a braking force.

Another object of this invention is to provide an electromagnetic rail capable of efficiently dissipating the heat generated in the armature coil so as to prevent the deterioration of the electromagnetic rail due to heat.

Another object of this invention is to provide an efficient method of manufacturing the electromagnetic rail of the present invention.

SUMMARY OF THE INVENTION

According to this invention these and other objects can be accomplished by providing an electromagnetic rail for driving a train by a semiconductor controlled rectifier linear motor of the type wherein an armature coil covered with electric insulation and utilized for imparting a driving and/or floating force to the train is mounted on a stationary support with the coil face of the armature coil disposed in the vertical direction, characterized in that the armature coil comprises a plurality of longitudinal rows of composite coil arrays juxtaposed with a certain phase, that each composite coil array comprises of two coil arrays, each having a plurality of serially connected rectangular coils, arranged in a straight line, spaced from one another with a pitch equal to the length of one coil, which are combined into a single row by so arranging the rectangular coils in one array as to fit in the one-coil-length intervals between the respective rectangular coils in the other array, the rectangular coils in one of the said two coil arrays being wound in a direction opposite to that of the rectangular coils in the other coil array.

Where it is desired to produce floating and braking forces for the train in addition to the driving force an induction coil is disposed beneath the armature coil with its plane disposed flush or parallel with the plane of the armature coil.

The armature coil or an assembly of the armature coil and the induction coil is moulded into a unitary structure with resin. The opposite side surfaces of the stationary support are utilized to contact with sliding current collectors for supplying exciting current to a field structure mounted on the train.

BRIEF DESCRIPTION OF THE DRAWINGS

FIG. 3 shows a perspective view, partly broken away, of an electromagnetic rail and a field structure cooperating therewith of a test model;

FIG. 4 is a diagram showing eight coil arrays which are staggered in parallel with a certain phase, each coil array consisting of a plurality of spaced rectangular coils which are connected in series with each other;

FIG. 5 shows a diagram of a combination of two coil arrays of rectangular coils which are wound in the opposite directions;

FIG. 6 is a perspective view of the combination shown in FIG. 5;

FIGS. 7A and 7B show cross-sections of the assembly shown in FIG. 6 taken along lines VIIA—VIIA and VIIB—VIIB, respectively;

FIG. 8 is a diagram showing a joint between the ends of composite armature coils each consisting of four arrays of rectangular coils;

FIG. 9 is a perspective view showing the manner of interconnecting the rectangular coils at the end of the armature coil;

FIG. 10 is a sectional view taken along a line X—X in FIG. 9;

FIG. 11 is a sectional view taken along a line XI—XI in FIG. 9;

FIG. 12 is a graph showing the temperature rise characteristic of the armature coil;

DESCRIPTION OF THE PREFERRED EMBODIMENTS

Figure 1:
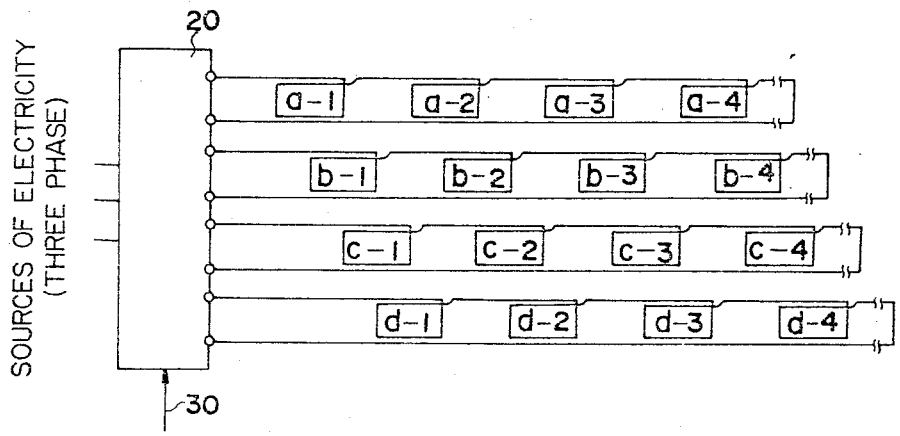
FIG. 1 is an electrical diagram showing an example of the most suitable driving system for automatic control of high speed railway vehicles not shown.
Figure 2:
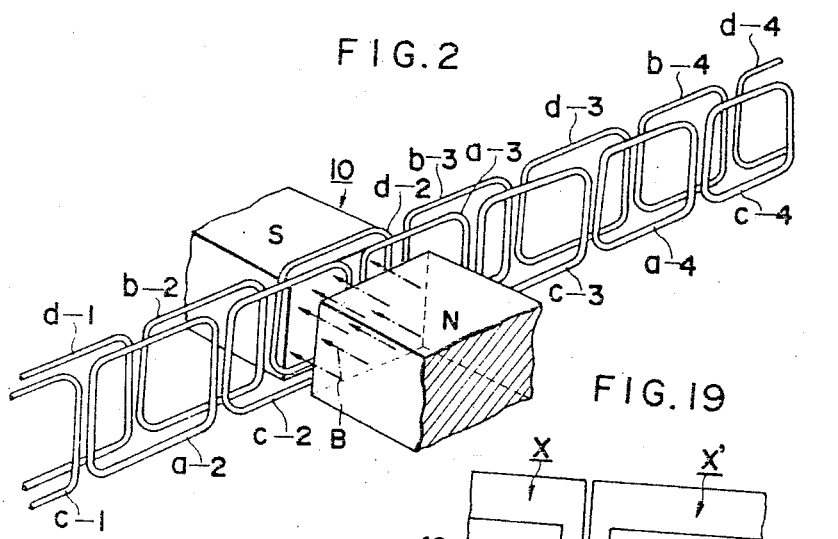
FIG. 2 is a perspective view of ground coils and the field structure mounted on a vehicle.

Referring now to the accompanying drawings, FIG. 5 thereof shows a simplified diagram of a composite coil array comprising a combination of two coil arrays each consisting of a plurality of single turn rectangular coils, the coils of the two coil arrays are wound in the opposite direction. Thus, the rectangular coils 1—1, 1–2 and 1–3 of one coil array N1 are wound in the clockwise direction, whereas rectangular coils 5–1, 5–2 and 5–3 of the other coil array N5 are wound in the counter clockwise direction and these coil arrays are arranged juxtaposed with the respective rectangular coils of one array disposed in the gaps between adjacent rectangular coils of the other array. This composite coil array corresponds to the combination of the first and fifth coil arrays, or the second and sixth coil arrays or the third and seventh coil arrays or the fourth and eighth coil arrays which are shown in FIG. 4, or generally speaking to the combination of the k-th coil array and the $(n/2 + k)$th coil array in n parallel arrays, wherein the coils of two arrays in each combination are wound in the opposite directions. A plurality of composite coil arrays are arranged in parallel as shown in FIG. 3 to form an armature coil for the novel electromagnetic rail.

FIG. 6 shows a perspective view of the composite coil array diagrammatically shown in FIG. 5, the cross-sections taken along lines VIIA—VIIA and VIIB—VIIB of FIG. 6 being shown in FIG. 7A and 7B, respectively. As can be noted from FIGS. 7A and 7B, since the coils of two coil arrays constituting a composite coil array are wound in the opposite directions, the width $w$ and the height $h$ of the composite coil array are equal to the width and height of each coil array.

Although the novel electromagnetic rail for driving trains by semiconductor controlled rectifier linear motor, including an armature winding composed of a predetermined number of composite coil arrays, each consisting of two arrays of rectangular coils which are wound in the opposite directions, is electrically equivalent to an electromagnetic rail utilized for the same purpose and including an armature winding comprised by a plurality of parallelly disposed composite coil arrays, each consisting of a plurality of rectangular coils which are wound in the same direction to pass current in the same direction, the size of the armature coil and hence the weight of the magnetic structure of the novel electromagnetic rail are decreased greatly.

If desired, the conductor for forming the rectangular coils utilized in this invention may be split into a desired number of parallel strands or transposed for the purpose of decreasing eddy current loss and skin effect, and it is especially preferable to form the rectangular coil with a conductor having a rectangular cross-section for improvement of the space factor of the coil.

Where each rectangular coil utilized for forming an armature coil comprises two or more turns of a conductor having a rectangular cross section of 100 mm × 5 mm, for example, and where a large number of coil arrays of such rectangular coils are interconnected to form a long electromagnetic rail, difficulties are encountered at the time of interconnecting the coil arrays. More particularly, in the case of the coil of busbar shaped conductor, like the method of interconnecting ordinary bus-bars, the adjacent ends of the coil arrays may be overlapped on the area calculated to provide a prescribed contact resistance, and then the overlapped ends are bolted together. Alternatively, the adjacent ends may be abutted each other and then connected together with silver brazing. However, in these cases, since each coil includes two or more juxtaposed conductors, there is no space available for mounting a jig for tightening bolts or rivets. Furthermore, as a field structure keeping a desired clearance is mounted on the electromagnetic rail the thickness of the connected part of the coil must be kept within that of the rail. Furthermore as the adjacent coil conductors of the armature winding are separated by an insulator, coil connection by silver brazing or the like which requires heating of the coil conductors to high temperatures is not suitable. However, in the electromagnetic rail of this invention, certain vertical sides of respective rectangular coil arrays (e.g. marked with small circles in FIG. 4) of the armature coil do not overlap with one another.

Therefore the electrical connection between the arrays can be made by bending the horizontal side of the last turn toward inside of the coil to form a vertical side, as shown in FIG. 9.

In FIG. 9, 103 is the vertical side of the last turn, that is, the second turn in this particular case, of the rectangular coil, formed by bending the end portion of the horizontal side 102 toward the inside of the coil in such a manner that it does not overlap the vertical side 101 of the first turn. As is evident from FIG. 9, the connection can be made without being obstructed by the vertical side 101 of the adjoining coil 100. Therefore, the two vertical sides can be connected together electrically and mechanically by any optional method such as bolting, riveting 300, welding.

The integrated electromagnetic coil thus connected does not increase in thickness as seen in FIG. 10 showing the sectional view of the assembly taken along A—A in FIG. 9 and also in vertical dimension as seen in FIG. 11 showing the sectional view of the assembly taken along A—A in FIG. 9.

Since the novel electromagnetic rail is constructed as above described, the ends thereof has acomplicated multistep construction so that installation of the rails and interconnection thereof in the field are difficult. To reduce such difficulty it is advantageous to construct the armature coil of the novel electromagnetic rail as shown in FIG. 8, for example. The armature coil shown in FIG. 8 comprises four juxtaposed rows of eight coil arrays. The first row comprising the first and fifth coil arrays N1 and N5 which are arranged in a straight line, the second row, the third and seventh coil arrays N3 and N7, the third row, the second and sixth coil arrays N2 and N6, and the fourth row, the fourth and eighth coil arrays N4 and N8. The coils of the coil arrays N1 and N5 of the first row and the coils of the arrays N3 and N7 of the second row are phase-shifted each other by one-half coil length pitch. In the same manner, coils of the coil arrays N2 and N6 of the third row are phase-shifted by one-half pitch from the coils of the coil arrays N4 and N8 of the fourth row. The construction of the rail end can be greatly simplified by providing smaller coils of one-half coil length pitch, to the ends of coil arrays that is 1–3a, 2–3a, 1–3b and 2–3b. This construction greatly facilitates the connection between coil conductors.

As above described, the car driving system utilizing the semiconductor controlled rectifier linear motors comprises an armature coil and a field structure as its basic components, and floating, acceleration, deceleration and stop of the car are accomplished by controlling the current flowing through the armature coil by the controlled rectifiers. When an emergency occurs and the armature current is interrupted while the car is floated and running at an extremely high speed, the car body falls down quickly thereby greatly harming the passengers, the car and the electromagnetic rail. Although such harm may be alleviated by providing an emergency brake, emergency grounding wheel or many other types of safety devices, quick application of the emergency brake during ultra high speed running is accompanied with a danger. On the other hand, it is difficult to construct the emergency ground wheels to have sufficient mechanical strength and it takes a certain length of time between the occurrence of the emergency and the grounding of the ground wheels. Moreover, it is necessary to construct the ground wheel and the electromagnetic rails such that they have sufficient strength to withstand the shock load created by the drop of the heavy weight cars of the order of 40 tons per car. Such safeness can not be secured by a brake system and wheels alone.

According to this invention, a rectangular short circuited coil (hereinafter, referred to as "induction coil") having a coil plane substantially flush or parallel with the plane of the armature coil is positioned beneath the armature coil, and the assembly of the armature coil and the short induction coils are covered with a protective coating and secured to a stationary support. With this construction, a portion of the magnetic flux created by the magnetic structure carried by the running car links induction coils to induce therein a current which functions to create floating and braking forces. The floating force thus created prevents quick fall of the car caused by interruption of the current flowing through the armature coil while the car is floating during high-speed running. Said braking force decelerates the car, which can then be safely grounded.

When a train driven by the semiconductor controlled rectifier linear motors is floated and operated at an ultrahigh speed of 500 km/hr, for example, and assuming the weight of a car to be 40 tons, the driving force and the floating force required for such ultra-high speed operation amount of 5 tons and 40 tons per car, respectively. Accordingly, the magnetomotive force that must be produced by the armature coil amounts to as much as 80,000 AT. Assuming a length of one electromagnetic rail feed section to be 500 m, the sum of the counter electromotive force and the commutation surge induce in the armature coil as the car runs will amount to 20 KV, whereby a high voltage will also be induced in the induction coil located beneath the armature coil. Accordingly, the insulating covering used to protect the assembly of the armature coil and the induction coil should have a sufficently high dielectric strength. To this end it is advantageous to interpose a grounded shield of metal layer between the armature coil and the induction coil or between the armature coil and the support for the electromagnetic rail. However, in order to prevent eddy current from being induced in the shield layer by the magnetic flux created by the car-mounted field structure, it is preferable to use the shield layer with a metal layer covering part of its surface, not the entire surface, such as providing suitable slits.

In order to provide a large magnetomotive force of 80,000 AT for the electromagnetic rail it is necessary to pass a high current density of the order of 15A/mm$^2$ through the armature coil thereby causing a large Joule heat in the armature coil. For example, supposing that trains, each 300 m long, run at a space of 500 km/hour at 5-minute intervals on electromagnetic rails having armature coils, each 5 cm$^2$ in the cross-sectional area of conduction, and composed of 500 m long conductor sections the temperature rise of the armature coil caused by the Joule heat accumulating with time will ultimately come close to about 80°C as shown in FIG. 12. In the low speed running range of the train where the current is applied longer (it takes the train a longer time to pass through the electromagnetic rail feed section, 500m) this temperature rise is even greater for example, to 400°C and even to 1,000°C near stations at a running speed of 50 km/hr.

Such excessive temperature rise will greatly degrade or damage electric insulators, fillers and protective covers which compose part of the electromagnetic rail as well as the coil conductor, thereby causing mechanical failure of the electromagnetic rail. Accordingly, it is highly desirable to provide an effective means for dissipating the heat accumulated in the electromagnetic rail.

Figure 13:
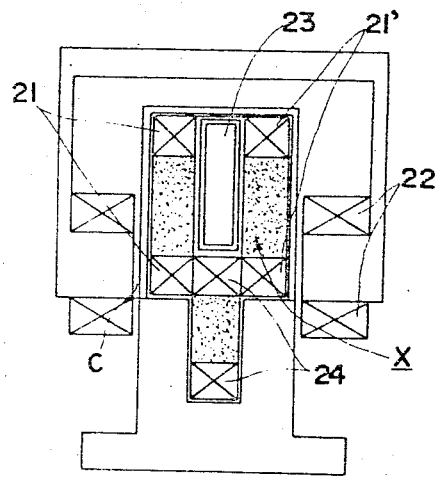
FIG. 13 is a cross-sectional view of an electromagnetic rail provided with a cooling pipe.
Figure 14:
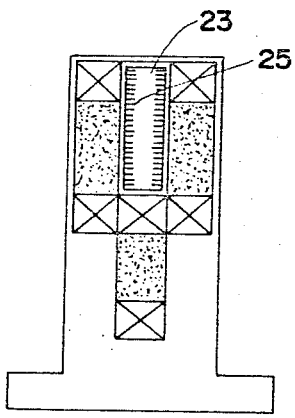
FIGS. 14 and 15 are similar cross-sectional views showing modified cooling pipes.
Figure 15:
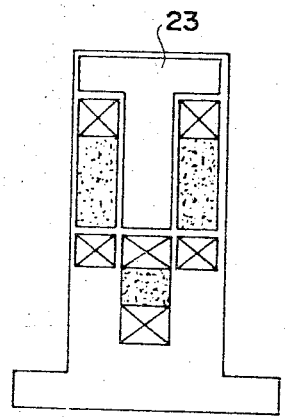

To make effective utilization of the characteristics of the semiconductor controlled rectifier linear motor, as shown in FIG. 13, it is advantageous to make an extremely narrow clearance C between the armature coils 21, 21' and the exciting coils 22 for the car mounted field structure, for example, about 10 mm. For this reason, it is difficult to install a cooling means in the form of a coolant conduit, for example, in the space between the electromagnetic rail and the field structure. However, in the novel electromagnetic rail with an induction coil, it is possible to efficiently dissipate the heat generated in the armature coil and to increase the mechanical strength by disposing the plane of the armature coil in the vertical direction, arranging a conduit 23 of high heat conductivity non-magnetic metals such as copper, aluminum and stainless steel for passing cooling fluid such as air, oil or water, above the induction coils which are disposed in a straight line and by arranging a coil X formed by integrally moulding the armature coil divided into two halves which are disposed on the opposite sides of the conduit 23, as shown in FIG. 13. The non-magnetic metal conduit 23 may be provided with fins 25 on the inner surface as shown in FIG. 14, or may take a letter T shape configuration, as shown in FIG. 15, for the purpose of increasing the heat dissipating efficiency.

Figure 16:
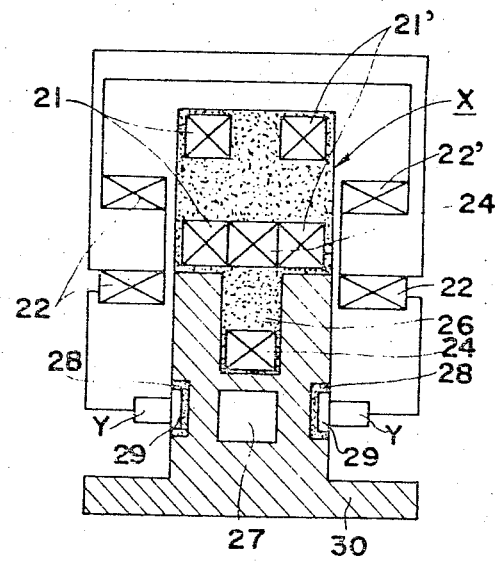
FIG. 16 shows a cross-section of another electromagnetic rail in which a cooling pipe and feeders for exciting the magnetic field on the vehicle are mounted on a support.

The stationary support 30 for the moulded coil assembly may be constructed as shown in FIG. 16. The support 30 shown in FIG. 16 is made of a non-magnetic metal such as aluminum and is formed with an elongated slot 26 on its upper surface for receiving an induction coil 24 and a coolant passage 27 below the slot 26. The Joule heat accumulated in the armature coil and the induction coil can be efficiently dissipated by passing suitable coolant through the coolant passage 27. When the support 30 shown in FIG. 16 is used, it is possible to secure current feeders 29 for the exciting coils 22, 22' of the field structure on both sides of the support through electric insulators 28.

Where it is desired to use the support 30 itself as a current feeder for the field exciting coils 22, 22', the support may be made of non-magnetic metal and split into two longitudinal halves which are united with an insulator in between, and current collectors Y for the field coils 22, 22' are so arranged as to slide along the side surfaces of the support.

Figure 17:
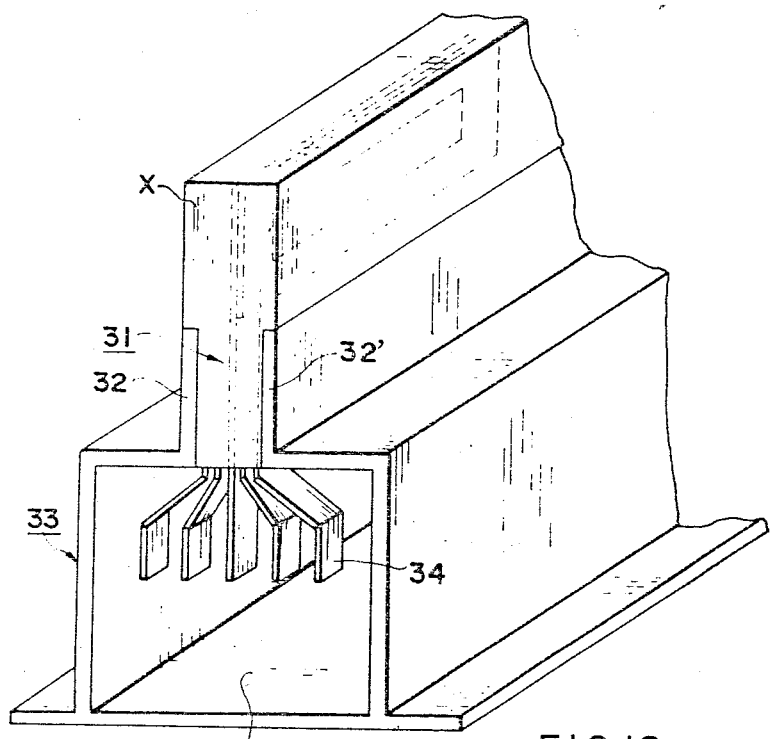
FIG. 17 is a perspective view of a hollow box shaped support.

Alternatively, the support may be constructed as shown in FIG. 17 wherein the support comprises a hollow box like base 33 made of concrete or non-magnetic material, and a pair of opposed coil supporting members 32 and 32' projecting upwardly from the upper surface of the base 33 along both side edges of an opening, said supporting members 32 and 32' defining a space therebetween for receiving the moulded coil assembly X. With this construction the moulded coil assembly X can be securely clamped between the supporting members 32 and 32' and the connecting leads 34 for interconnecting the coil conductors constituting the moulded coil assemblies X can be suspended in the interior 35 hollow of the base 33 thereby facilitating the connecting operation, inspection and maintenance of the leads of coil conductors between adjacent electromagnetic rails as well as the replacement of the electromagnetic rails.

Usually, the electromagnetic rail is subject to a force caused by the rolling of the car while it is running along a straight portion of the railroad and to a side pressure which is created when the train travels along a curved portion, in addition to the required driving force and the floating force for the car. With the base 33 shown in FIG. 17, the vertical side surfaces of the base 33 can be used to receive such lateral forces.

The connection of coil conductors between adjacent electromagnetic rails may be made within the rails or on the outside of the rails by leading out the conductors. The connection of the latter scheme should be made at the end of the electromagnetic rail. Further, since certain degree of thermal expansion and contraction of the electromagnetic rail is inevitable due to the temperature rise of the armature coil and to variation in the ambient temperature, it is necessary to provide some means for treating such thermal expansion and contraction.

Figure 19:
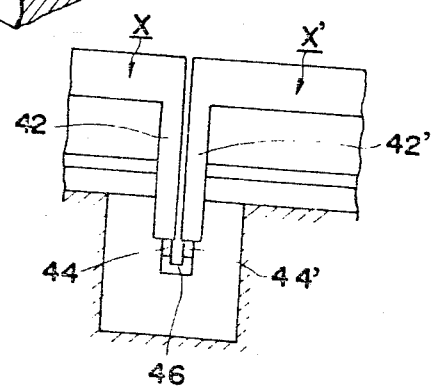
FIG. 19 shows a longitudinal sectional view of two molded armature coil structures shown in FIG. 18 which are disposed on a straight line with their moulded leads positioned closely adjacent.
Figure 18:
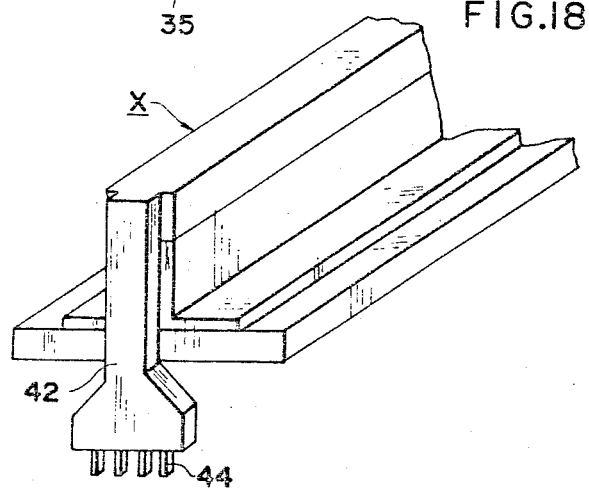
FIG. 18 is a perspective view of one end of a molded armature coil structure with integrally moulded leads.

As shown in FIG. 18, the moulded coil assembly X for the novel electromagnetic coil may be provided with a moulded member 42 integral with the moulded coil assembly X and containing the downwardly extending leads 44 of the coil conductors. As shown in FIG. 19, two moulded members 42 and 42' on the adjacent ends of the moulded coil assemblies X and X' are brought closely spaced apart and the leads 44 and 44' are interconnected by flexible jumpers 46. This construction prevents the generation of the stress caused by the thermal expansion and contraction of the rails, improves the dielectric strength of the high voltage parts and facilitates the field working, maintenance and inspection.

In case the electromagnetic rail is provided in their longitudinal direction with a resilient semiconductive layer in which the armature coil conductor is imbedded, even when corona discharge occurs due to a high interphase voltage of, for example, 20 Kv, there is no fear of deterioration of the insulation, and in addition, it is possible to alleviate the stress caused by thermal expansion and contraction due to temperature rise of the rails.

When the novel electromagnetic rails of this invention are used to construct railroads for running ultra high speed trains, the trains can be readily operated safely at ultra high speeds exceeding 300 km/hr. However, it should be understood that the novel electromagnetic rails are not limited to use for such ultra-high speed trains alone, but can be used for various types of trains running at lower speeds.

Although, in the foregoing description preferred constructions of the electromagnetic rail have been described by taking into consideration improvements of thermal and electrical characteristics of the rail, the invention also provides an efficient method of manufacturing such electromagnetic rails for running trains by semiconductor controlled rectifier linear motors.

One method comprising the steps of preparing a composite coil array; one of the coil arrays including a plurality of serially connected rectangular coils which are spaced from one another with a pitch equal to one coil length and are arranged in a straight line, the other coil array having a construction similar to that of said one coil array but the rectangular coils thereof being wound in the direction opposite to that of the rectangular coils of said one coil array; respective rectangular coils of said one coil array being displaced one coil length pitch from respective rectangular coils of the other coil array; arranging a desired number of such composite coil arrays in the longitudinal direction of the rail; and applying liquid resin onto the composite coil arrays to form intercoil layer insulation and a protective covering surrounding the composite coil arrays and to fill the gap between the coils, thereby forming a unitary moulded coil assembly.

Another method comprises the steps of preparing a composite coil array; one of the coil arrays including a plurality of serially connected rectangular coils which are spaced from one another with a pitch equal to one coil length and are arranged in a straight line, the other coil array having similar construction to that of said one coil array but the rectangular coils thereof being wound in the direction opposite to that of the rectangular coils of said one array; respective rectangular coils of said one coil array being displaced one coil length pitch from respective rectangular coils of the other coil array; arranging a plurality of such composite coil arrays in the longitudinal direction of the rail; arranging a plurality of induction coils with their coil planes substantially in flush or parallel with the coil plane of the composite coil arrays; and applying liquid resin onto the assembly of the composite coil arrays and the induction coils to form intercoil layer insulation and a protective covering surrounding the assembly and to fill the gap between the coils thereby forming a unitary coil assembly.

What is claimed is:

1. An electromagnetic rail for driving a train by a semiconductor controlled rectifier linear motor of the type wherein an armature coil covered with an electric insulating covering and utilized for imparting a driving and/or a floating force to the train is mounted on a stationary support with the coil plane of said armature coil disposed in the vertical direction, characterized in that said armature coil comprises a plurality of longitudinal rows of composite coil arrays juxtaposed with a certain phase, that each composite coil array comprising two coil arrays, each having a plurality of serially connected rectangular coils, arranged in a straight line, spaced from one another with a pitch equal to the length of one coil, which are combined into a single row by so arranging the rectangular coils in one array as to fit in the one-coil-length intervals between the respective rectangular coils in the other array, the rectangular coils in one of the said two coil arrays being wound in the direction opposite to that of a rectangular coils in the other coil array.

2. The electromagnetic rail according to claim 1 wherein each of said rectangular coils is formed by a conductor having a rectangular cross-section.

3. The electromagnetic rail according to claim 1 wherein said armature coil comprises at least four juxtaposed rows of composite coil arrays, at the most, a half of which are provided, at their ends, with a smaller coil, half the one-coil-length pitch.

4. The electromagnetic rail according to claim 1 wherein connection between two arrays of rectangular coils, each having at least two juxtaposed rectangular turns, is formed by bending the end portion of the horizontal side of the last turn toward the inside of the coil as much as at the width of the vertical side of the first turn.

5. The electromagnetic rail according to claim 1 wherein a plurality of short circuited induction coils are disposed beneath said armature coil, said induction coil being arranged on a straight line in the longitudinal direction of said rail with the coil planes of said induction coils disposed in the vertical direction, said induction coils being mounted on said support such that they are interlinked by the magnetic flux generated by a field structure mounted on the car so as to produce a floating force and a braking force.

6. The electromagnetic rail according to claim 5 wherein an electroconductive shield layer is interposed between said armature coil and said induction coils, said shield layer being constructed to prevent the flow of eddy current herein.

7. The electromagnetic rail according to claim 5 wherein an electroconductive shield layer is interposed between said armature coil and said support, said shield layer being constructed to prevent the flow of eddy current therein.

8. The electromagnetic rail according to claim 5 wherein a non-magnetic metal conduit for passing cooling fluid is disposed on said induction coils and said armature coil is disposed on the opposite sides of said conduit.

9. The electromagnetic rail according to claim 8 wherein said armature coil, said metal conduit and said induction coils are formed into a integral unit and the integral unit is mounted on said support.

10. The electromagnetic rail according to claim 5 wherein said support is made of nonmagnetic metal, and provided with an elongated slot on the upper surface thereof for receiving said induction coils, and a conduit for passing cooling fluid beneath said elongated slot, and wherein means for feeding exciting current to a field structure mounted on the car are mounted on both sides of said support with insulators in between.

11. The electromagnetic rail according to claim 1 wherein said support itslef includes a pair of longitudinal halves of non-magnetic metal which are clamped together with an insulator interposed therebetween, the opposite side surfaces of said support being adapted to the slidably engaged by current collectors for a field exciting coil mounted on the car and wherein said support is mounted on a grounded structure with an insulator in between.

12. The electromagnetic rail according to claim 1 wherein said support comprises a hollow box shaped base of nonmagnetic material, the upper surface of the base is provided with a longitudinal opening and a pair of opposed upwardly projecting supporting members along the side edges of said opening, a moulded body of said armature is clamped between said supporting members and the connecting leads for interconnecting the ends of adjacent coil arrays are extended downwardly into said hollow box shaped box through said opening.

13. The electromagnetic rail according to claim 1 wherein the electromagnetic rail is provided in the longitudinal direction with a resilient semiconductive layer in which the armature coil conductor is imbedded.

14. The electromagnetic rail according to claim 1 wherein said armature coil is moulded into an integral structure, and the leads of said armature coil are moulded integrally with said integral structure.

15. A method of manufacturing an electromagnetic rail for driving a train by semiconductor controlled rectifier linear motor comprising the steps of preparing a plurality of composite coil arrays, each composite coil array including first and second coil arrays, said first coil array being fabricated by serially connecting a plurality of rectangular coils which are spaced from one another with a pitch equal to one coil length and arranging said rectangular coils in a straight line, said second coil array being fabricated similarly to said first coil array but wherein the rectangular coils thereof are wound in a direction opposite to that of the rectangular coils of said first coil array; displacing respective rectangular coils of said first coil array one coil length pitch from respective rectangular coils of said second coil array; arranging a number of said composite coil arrays in the longitudinal direction of said rail; and applying liquid resin onto the composite coil arrays to form intercoil layer insulations and a protective covering surrounding the composite coil arrays and to fill the gap between the coils, thereby forming a unitary moulded coil assembly.

16. A method of manufacturing an electromagnetic rail for driving a train by semiconductor controlled rectifier linear motor comprising the steps of preparing a plurality of composite coil arrays, each composite coil array including first and second coil arrays, said first coil array being fabricated by serially connecting a plurality of rectangular coils which are spaced from one another with a pitch equal to one coil length and arranging said rectangular coils in a straight line, said second coil array being fabricated similarly to said first coil array but wherein the rectangular coils thereof are wound in a direction opposite to that of the rectangular coils of said first coil array; displacing respective rectangular coils of said first coil array one-coil-length pitch from respective rectangular coils of said second coil array; arranging a plurality of said composite coil arrays in the longitudinal direction of the rail; arranging a plurality of induction coils with their coil planes substantially flush or in parallel with the coil plane of said composite coil arrays; and applying liquid resin onto the assembly of said composite coil arrays and said induction coils to form intercoil layer insulations and a protective covering surrounding the assembly and to fill the gap between the coils, thereby forming a unitary coil assembly.

* * * * *